UNITED STATES PATENT OFFICE.

WILLIAM HOSKINS, OF CHICAGO, ILLINOIS.

UTILIZATION OF CATALYST MASSES.

1,381,558.  Specification of Letters Patent.  Patented June 14, 1921.

No Drawing.  Application filed January 31, 1921. Serial No. 441,504.

*To all whom it may concern:*

Be it known that I, WILLIAM HOSKINS, a citizen of the United States, residing at 2009 Harris Trust Bldg., Chicago, in the county of Cook and State of Illinois, have invented a new and useful Improvement in the Utilization of Catalyst Masses, of which the following is a specification.

The present invention relates to the utilization of "nickel mass," by which term is designated the waste or "sick" catalyst from hydrogenation processes with the accompanying carrier and hydrogenated oil or fat. It will be fully understood from the following description.

"Nickel mass," as employed herein, refers to the mass of catalyst, generally nickel, which has been used in hydrogenation until its catalytic activity has depreciated or become destroyed, and which is accompanied by a carrier, such as asbestos or kieselguhr, and by fat or oil. A typical analysis of such material shows 50% of hydrogenated fat or oil and 12½% of nickel, the remainder being carrier, for example, asbestos. These proportions may, of course, vary widely.

In accordance with the present invention, nickel mass may be separated into its constituents in the following manner: The nickel mass, in a suitable container, is agitated with sufficient dilute solvent acid such as sulfuric acid of 10 to 14% strength to effect solution of the nickel, a suitable proportion being 15 gallons of acid per 100 lbs. of the mass of approximately the analysis above set forth. Stronger acid may be used, if desired, but may tend to discolor the separated oil. During agitation the mixture is preferably heated to 125 to 180° F. The agitation is continued until foaming ceases. The entire mass is then forced through a filter press, in which the carrier, which may be asbestos, is retained. The liquid portion of the mixture is conveyed to a suitable receptacle and permitted to settle. The mass of carrier in the filter press may be washed with hot water, the water being added to the separated liquid portion of the mixture.

The liquid portion of the mixture, on settling, stratifies, the nickel sulfate solution forming the lower layer and the hydrogenated fat the upper. The nickel sulfate solution is drawn off, and the fat washed with hot water, the wash water being added to the nickel sulfate solution, or reused in washing fat until its concentration is increased to 5 to 8% nickel sulfate, when it may be added to the separated nickel sulfate solution. The washed fat may be cooled and is available for the ordinary uses of hydrogenated fats or oils.

In case a layer of emulsion of fat in nickel solution forms between the nickel solution and the clear fat, this may be separately drawn off and may be added to the next batch of liquid mixture drawn off from the filter press or may be separated into its constituents, for example, by centrifuging.

The separated nickel solution may be filtered and crystallized to produce nickel sulfate crystals or an equivalent amount of ammonium sulfate may be added to the solution and nickel-ammonium sulfate crystallized out.

It is readily apparent that the solvent acid employed may be, for example, hydrochloric or nitric acid and that the process may be used for treatment of the catalyst-masses when other metals than nickel are used; for example, cobalt.

I claim:

1. The method of separating a catalyst-mass derived from oil hydrogenation processes into its constituents which comprises mixing the mass with solvent acid at a temperature sufficiently high to liquefy the fat present and filtering the mixture, thereby separating out the carrier.

2. The method of separating a catalyst-mass derived from oil hydrogenation processes into its constituents which comprises mixing the mass with solvent acid at a temperature sufficiently high to liquefy the fat present, filtering the mixture, thereby separating out the carrier, and settling the liquid mixture, thereby separating the oil and catalyst solution.

3. The method of separating nickel mass derived from oil by hydrogenation processes into its constituents which comprises mixing it with solvent acid at a temperature sufficiently high to liquefy the fat present and filtering the mixture to separate out the carrier.

4. The method of separating nickel mass derived from oil by hydrogenation processes into its constituents which comprises mixing it with solvent acid at a temperature sufficiently high to liquefy the fat present, filtering the carrier from the liquid and settling the latter to cause separation of the nickel solution and the fat.

5. The method of separating nickel mass derived from oil by hydrogenation processes into its constituents which comprises mixing it with dilute sulfuric acid at a temperature sufficiently high to liquefy the fat present, filtering the carrier from the liquid and settling the latter to cause separation of the nickel solution and the fat.

6. The method of separating the constituents of a catalyst-mass derived from oil by hydrogenation processes which comprises mixing the mass with solvent acid at a temperature sufficiently high to liquefy the mass, filtering the carrier out of the mixture, settling the liquid mixture, withdrawing clear catalyst solution, removing any intermediate layer of emulsion of fat and solution and adding it to the next batch of liquid mixture to be settled.

WILLIAM HOSKINS.